United States Patent
Averill et al.

(10) Patent No.: US 7,756,688 B2
(45) Date of Patent: Jul. 13, 2010

(54) DESIGN OPTIMIZATION SYSTEM AND METHOD

(75) Inventors: Ronald C. Averill, East Lansing, MI (US); Ran Mohan Jit Singh Sidhu, Bath, MI (US); Praveen Halepatali, Rochester, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 11/579,711

(22) PCT Filed: May 9, 2005

(86) PCT No.: PCT/US2005/016263

§ 371 (c)(1),
(2), (4) Date: Nov. 3, 2006

(87) PCT Pub. No.: WO2005/111797

PCT Pub. Date: Nov. 24, 2005

(65) Prior Publication Data

US 2007/0244678 A1    Oct. 18, 2007

Related U.S. Application Data

(60) Provisional application No. 60/569,595, filed on May 10, 2004.

(51) Int. Cl.
*G06F 7/60* (2006.01)
*G06F 17/10* (2006.01)
*G06F 17/50* (2006.01)

(52) U.S. Cl. .............................. 703/2; 703/1

(58) Field of Classification Search .................... 703/1, 703/2; 700/97, 89; 706/13
See application file for complete search history.

(56) References Cited

U.S. PATENT DOCUMENTS

| 5,297,057 A | 3/1994 | Kramer et al. | |
| 5,552,995 A * | 9/1996 | Sebastian | 700/97 |
| 5,754,738 A * | 5/1998 | Saucedo et al. | 706/11 |
| 6,847,854 B2 * | 1/2005 | Discenzo | 700/99 |
| 2003/0009317 A1 * | 1/2003 | Dhir et al. | 703/7 |

OTHER PUBLICATIONS

International Search Report for PCT/US05/16263 dated Oct. 17, 2007, 4 pages.
J. Sobieszczanski-Sobieski et al.; "BLISS/S: A New Method For Two-Level Structural Optimization;" Struct. Multidisc. Optim. 21, 2001; pp. 1-13.
R. Balling et al.; "An Algorithm for Solving the System-Level Problem in Multilevel Optimization;" Structural Optimization 9, 1995; pp. 168-177.

(Continued)

*Primary Examiner*—Dwin M Craig
(74) *Attorney, Agent, or Firm*—Harness, Dickey & Pierce, P.L.C.

(57) ABSTRACT

A design optimization system includes an initial design evaluation module evaluating a system model using initial subsystem designs to extract interactions between subsystem models and/or between the system and the subsystem models. An updating module updates the interactions for the subsystem models, and an optimization module performs subsystem design optimization using the subsystem model and most recently updated interactions, thereby obtaining an updated subsystem design.

46 Claims, 4 Drawing Sheets

OTHER PUBLICATIONS

N. Michelena, et al.; "Hierarchial Overlapping Coordination for Large-Scale Optimization by Decomposition;" AIAA Journal, vol. 37, No. 7, Jul. 1999; pp. 890-896.

N. Michelena, et al.; "A System Partitioning and Optimization Approach to Target Cascading;" International Conference on Engineering Design, ICED 99 Munich, Aug. 24-26, 1999; 6 pages.

J. Allison, et al.; "On the Use of Analytical Target Cascading and Collaborative Optimization for Complex System Design;" 6th World Congress on Structural and Multidisciplinary Optimization, Rio de Janeiro, Brazil; May 30-Jun. 3, 2005; pp. 1-10.

R. Balling et al.; "Collaborative Optimization with Disciplinary Conceptual Design;" Struct Multidisc Optim 20, © Springer-Verlag 2000; pp. 232-241.

A-V DeMiguel et al.; "An Analysis of Collaborative Optimization Methods;" AIAA-2000-4720, 2000; pp. 1-13.

R. Braun et al.; "Implementation and Performance Issues in Collaborative Optimization;" AIAA, 1996; pp. 1-11.

N. Alexandrov et al.; "Analytical and Computational Aspects of Collaborative Optimization for Multidisciplinary Design;" AIAA Journal, vol. 40, No. 2, Feb. 2002; pp. 301-309.

I. Kroo; "Distributed Multidisciplinary Design and Collaborative Optimization;" VKI lecture series on Optimization Methods & Tools for Multicriteria/Multidisciplinary Design, Nov. 15-19, 2004; pp. 1-22.

O. Cetin et al.; "Decomposition-Based Assembly Synthesis of Multiple Structures for Minimum Production Cost; "Proceedings of IMECE 2003, 2003 ASME International Mechanical Engineering Congress, Washington, D.C., Nov. 15-21, 2003; IMECE2003-43085; pp. 1-10.

O. Cetin et al.; "Decomposition-Based Assembly Synthesis for Structural Modularity;" Journal of Mechanical Design, vol. 126, Mar. 2004; pp. 234-243.

O. Cetin et al.; "Decomposition-Based Assembly Synthesis for Maximum Structural Strength and Modularity;" Journal of Mechanical Design, vol. 126, Mar. 2004; pp. 244-253.

N. Lyu et al.; "Decomposition-Based Assembly Synthesis for Structural Stiffness;" Journal of Mechanical Design, vol. 125, Sep. 2003; pp. 452-463.

F. Yetis et al.; "Decomposition-Based Assembly Synthesis Based on Structural Considerations;" Proceedings of DETC 2000, ASME 2000 Design Engineering Technical Conference and Computers and Information in Engineering Conference, Baltimore, Maryland, Sep. 10-13, 2000; DETC 2000/DAC-14228; pp. 1-10.

H. Min Kim et al.; "Analytical Target Cascading in Automotive Vehicle Design; "Journal of Mechanical Design, vol. 125, Sep. 2003; pp. 481-489.

H. Min Kim et al.; "Target Cascading in Optimal System Design; "Journal of Mechanical Design, vol. 125, Sep. 2003; pp. 474-480.

D. Adams et al.; "Global/Local Iteration for Blended Composite Laminate Panel Structure Optimization Subproblems;" Presented at the Spring Simulation Multiconference (SpringSim '05), Hilton Mission Valley Hotel, San Diego, California, sponsored by the Society for Modeling and Simulation International (SCS), (Apr. 3-7, 2005); pp. 1-16.

A. Bagirov et al.; "Local Optimization Method with Global Multidimensional Search for Descent;" Journal of Global Optimization, vol. 32, No. 2, Jun. 2005; pp. 1-17.

N. Michelena et al.; "Convergence Properties of Analytical Target Cascading;" AIAA Journal, vol. 41, No. 5, (May 2003); pp. 897-905.

J. Allison et al; "Aircraft Family Design Using Decomposition-Based Methods;" 11th AIAA/SSMO Multidisciplinary Analysis and Optimization Conference, Sep. 6-8, 2006), Portsmouth, Virginia; AIAA 2006-6950; pp. 1-12.

I.P. Sobieski et al.; "Response Surface Estimation and Refinement in Collaborative Optimization;" Presented at the 7th AIAA/USAF/NASA/ISSMO Symposium on Multidisciplinary Analysis and Optimization, AIAA-98-4753; 1998; pp. 1-11.

N. Alexandrov et al.; "Comparative Properties of Collaborative Optimization and Other Approaches to MDO;" Proceedings of the First ASMO UK/ISSMO Conference on Engineering Design Optimization, Jul. 8-9, 1999; pp. 1-8.

H. Kim et al.; "Target Feasibility Achievement in Enterprise-Driven Hierarchical Multidisciplinary Design;" Presented at the 10th AIAA/ISSMO Multidisciplinary Analysis and Optimization Conference, Aug. 30-Sep. 1, 2004, Albany, New York, AIAA 2004-4546; pp. 1-14.

M. Kokkolaras et al.; "Design Optimization of Hierarchically Decomposed Multilevel Systems Under Uncertainty;" Proceedings of DETC 2004, ASME 2004 Design Engineering Technical Conferences and Computers and Information in Engineering Conference, Salt Lake City, Utah, Sep. 28-Oct. 2, 2004; DETC2004/DAC-57357; pp. 1-13.

I Kroo et al.; "Multidisciplinary Optimization Methods for Aircraft Preliminary Design;" Published by the American Aeronautics and Astronautics, Inc., © 1994 by Ilan Kroo; AIAA-94-4325-CP; 1994; pp. 697-707.

B. Liu et al.; "Two-Level Composite Wing Structural Optimization Using Response Surfaces;" Structural and Multidisciplinary Optimization Journal, vol. 20, No. 2, Oct. 2000; pp. 87-96 (11 pages).

J. Barthelmy; "Engineering Design Applications of Multilevel Optimization Methods;" NASA-Langley Research Center, Hampton, VA; (believed to have been published prior to May 2004), pp. 113-122.

L. Schmit et al.; "Multilevel Optimum Design of Structures with Fiber-Composite Stiffened-Panel Components;" AIAA Journal, vol. 20, No. 1, AIAA 80-0723R, Presented as Paper 80-0723 at the AIAA/ASME/ASCE/AHS 21st Structures, Structural Dynamics and Materials Conference, Seattle, Washington, May 12-14, 1980; pp. 138-147.

J. S-Sobieski et al; "Bilevel Integrated System Synthesis for Concurrent and Distributed Processing;" AIAA, vol. 41, No. 10, Oct. 2003; pp. 1996-2003.

J. S-Sobieski et al.; "Advancement of Bi-Level Integrated System Synthesis (BLISS);" AIAA, AIAA 2000-0421, 2000; pp. 1-9.

A. Striz et al.; "Displacement Based Multilevel Structural Optimization;" AIAA, AIAA-CP-4098, 1996; pp. 1-5.

Ching-Tzong Su et al.; "Reliability Optimization Design of Distribution Systems Via Multi-Level Hierarchical Procedures and Generalized Reduced Gradient Method;" IEEE, Catalogue No. 95TH8130, 1995; pp. 180-185.

J. S-Sobieski et al.; "Structural Optimization by Multilevel Decomposition;" AIAA Journal, vol. 23, No. 11, Nov. 1985; pp. 1775-1782.

J. S-Sobieski et al.; "Structural Sizing by Generalized, Multilevel Optimization;" AIAA Journal, vol. 25, No. 1, Jan. 1987; pp. 139-145.

R. Haftka; "An Improved Computational Approach for Multilevel Optimum Design;" J. Struct. Mech., 12(2), 1984; pp. 245-259.

M. Papadrakakis et al.; "Domain Decomposition Methods for Parallel Solution of Shape Sensitivity Analysis Problems;" International Journal for Numerical Methods in Engineering, 44, 1999; pp. 281-303.

R. Haftka et al.; "Multidisciplinary Design Optimization with Quasiseparable Subsystems;" Optimization and Engineering, 5, 2005; pp. 9-20.

* cited by examiner

DESIGN OPTIMIZATION SYSTEM AND METHOD

CROSS-REFERENCE TO RELATED APPLICATIONS

This application claims the benefit of U.S. Provisional Application No. 60/569,595, filed on May 10, 2004. The disclosure of the above application is incorporated herein by reference in its entirety for any purpose.

FIELD OF THE INVENTION

The present invention generally relates to design optimization, and relates in particular to the solution of optimization problems that are decomposed to facilitate a multi-level solution process that utilizes selective update of interactions between subsystems and/or between the system and its subsystem(s) in a form that is controlled by weight functions whose spatial and temporal distributions are predetermined and whose magnitudes are varied stochastically within a selected range.

BACKGROUND OF THE INVENTION

Optimization is a process that seeks to identify the best design according to a specified measure, or objective function, while also satisfying certain restrictions, or constraints. But mathematical methods used for optimization may not always identify the best design, and in these cases we seek to find as good a design as possible, or at least a design that is better than the existing one. Herein, use of the word optimal is intended to mean best, or as good as possible, or better than before, depending upon what is possible in that context and application.

We are concerned here with relatively large optimization problems, where large may refer to the number of design variables and/or the CPU time required to evaluate the objective function for a particular design candidate. In such cases it is common to break the problem into smaller parts, or subsystems, using decomposition.

Decomposition may be applied to the optimization problem itself, to the physical/temporal domain of the system, and/or to the disciplinary responses in a multidisciplinary problem. When an optimization problem is decomposed, the design variables are often segregated into sets so that the variables within each set interact closely, but interact weakly with the remaining design variables (those in other sets). Both physical and temporal domains can be decomposed into several smaller domains. In a multidisciplinary problem, each subsystem may represent a different disciplinary analysis of the same system. In each of these cases, the large design optimization problem can then be cast as a series of smaller optimization problems that are coordinated in order to optimize the entire system.

After an optimization problem is decomposed, the solution procedure may take one of several forms. Among the more popular methods is a multi-level optimization procedure. For example, in a two-level optimization procedure the optimization of the subsystem variables, $x^i$, is nested inside an upper-level optimization of the global variables, z. It is also possible to define a third set of variables, y, that are output from one subsystem and input to another subsystem. An iterative approach can then be used to coordinate the identification of the subsystem and global variables that jointly optimize the system. Most such iterative approaches depend upon the calculation of sensitivity derivatives of the optima of each subsystem with respect to changes in the global variables, z. Often, the calculation of these derivatives is either very difficult or computationally very expensive. In some cases, the sensitivity derivatives are discontinuous. The cost of calculating the sensitivity derivatives depends in part on the form of interaction between the subsystems and the number of design variables.

A solution procedure that does not require the calculation of sensitivity derivatives would be beneficial in many applications. Such an approach is often called direct iteration, or fixed-point iteration. This technique, however, has less than desirable convergence characteristics when applied to many classes of problems. Namely, problems in which significant changes in the interaction variables occur during the iteration process may not converge to a near optimal solution, and may fail to converge at all.

Here, a modified fixed-point iteration process is presented with a significantly enhanced ability to converge when applied to multilevel optimization of large problems.

SUMMARY OF THE INVENTION

In accordance with the present invention, a design optimization system includes an initial design evaluation module evaluating a system model using initial subsystem designs to extract interactions between subsystem models and/or between the system and the subsystem models. An updating module updates the interactions for the subsystem models, and an optimization module performs subsystem design optimization using the subsystem model and most recently updated interactions, thereby obtaining an updated subsystem design.

The present invention is advantageous over previous design optimization systems and methods in that potentially thousands of design iterations can be performed at the subsystem level in about the same amount of time required to perform 5-15 system level evaluations. Therefore, potentially hundreds or thousands of design parameters can be considered simultaneously. With this approach, engineers can achieve designs with significantly higher performance and robustness, and in less time. Furthermore, engineers can thoroughly explore new design concepts that were previously ignored due to their computational complexity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

We will first consider a particular special case of the broad problem class of interest for the purpose of describing the fundamental aspects of the new approach. In a subsequent section this approach will be generalized in several meaningful ways.

In large complex engineered systems (including structural, fluidic, thermal, acoustic, electro-magnetic, etc.), often only a subsystem or a small part of the system design needs to be modified to adapt or improve performance in some way. For example, to improve frontal crash safety in an automobile, an engineer might focus design changes on only the vehicle lower compartment rails and the bumper. To modify the lift or drag characteristics of an airplane, an aerospace engineer might focus only on the leading or trailing edge of a wing.

Figure 1B:
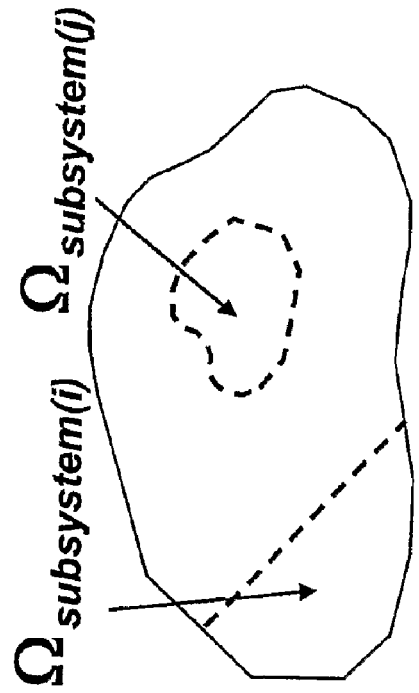
FIG. 1 is a set of Venn diagrams illustrating system and subsystems and their interfaces, whereupon interactions are measured between the system and the subsystems.
Figure 1A:
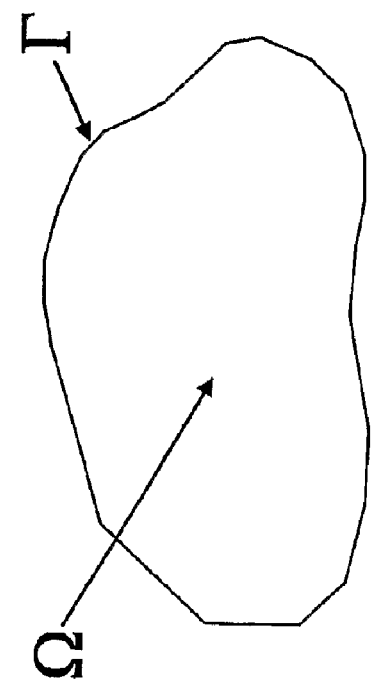

Referring to FIG. 1A, consider any continuous or discrete system that exists in the domain $\Omega$. The spatial and temporal performance of the system under a prescribed set of environmental conditions (generalized loads) can be described mathematically by equations (e.g., differential, integral, algebraic, etc.) in terms of primary variable(s) and the secondary variable(s). Domain $\Omega$ has boundary $\Gamma$.

Figure 1C:
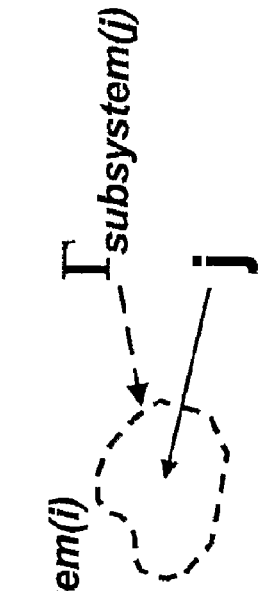

Referring now to FIG. 1B, within the system domain $\Omega$, one or more subsystems can be identified having domains according to $\Omega_{subsystem(i)}$ (i=1 to N), such as subsystem domain $\Omega_{subsystem(i)}$ and subsystem domain $\Omega_{subsystem(j)}$. The only restriction on the definition of the subsystems is that their domains may not overlap. Referring now To FIG. 1C, subsystem i and subsystem j having the domains described above must not have any common interior points for all i,j=1 to N, but subsystems may have common boundary points. The subsystem boundary $\Gamma_{subsystem(i)}$ represents the boundary between subsystem i and the remainder of the system. Similarly, subsystem boundary $\Gamma_{subsystem(j)}$ represents the boundary between subsystem j and the remainder of the system. It can be assumed here without loss of generality that the generalized displacements (primary variables) and/or generalized forces (secondary variables) at the boundary of subsystem i can be expressed as:

$$u = \hat{u}_{subsystem}(i) \text{ on } \Gamma_{subsystem}(i) \tag{1}$$

Referring generally now to FIGS. 1A-1C, of interest here is the common situation in which the performance of one or more subsystem designs is to be optimized by changing one or more characteristics (design variables) of the subsystem(s). For example, design variables may include shape parameters, material parameters, or any other feature or parameter in the subsystem(s). The subsystems do not share any design variables, and the remainder of the system (that which is not part of any defined subsystem) is fixed so there are no global design variables. In this context, a subsystem is optimized when a specified objective function is minimized or maximized, including the special case in which the subsystem satisfies a particular performance target. The subsystem designs may also be subject to a set of constraints that must be satisfied. The optimization is performed by finding the simultaneous values of a set of design variables that extremize the objective function while satisfying all constraints. Mathematically, the optimization statement within each subsystem i may take the form:

Minimize (or maximize)

$F_i(x_1, x_2, \ldots, x_n)^i$ such that $G_{ij}(x_1, x_2, \ldots, x_n)^i \leq 0, j=1, 2, \ldots, p_i$ $H_{ij}(x_1, x_2, \ldots, x_n)^i = 0, j=1, 2, \ldots, q_i$ where $(x_1, x_2, \ldots, x_n)^i$ are design variables in subsystem i $F_i(x_1, x_2, \ldots, x_n)^i$ is the objective (performance) function in subsystem i $G_i(x_1, x_2, \ldots, x_n)^i$ are inequality constraints in subsystem i $H_{ij}(x_1, x_2, \ldots, x_n)^i$ are equality constraints in subsystem i  (2)

The problem statement in Equation (2) is intended to include optimization problem statements in the broadest sense, including but not limited to multi-disciplinary and multi-objective optimization.

In some cases, even major changes to a subsystem design do not strongly affect the interactions between the system and the subsystem(s). In other words, there are some systems in which the subsystem interactions $\hat{u}_{subsystem(i)}$ experience small or no change when the values of design variables in any subsystem are modified. In these cases, the subsystem i can be redesigned in isolation using mathematical models involving only the domain $\Omega_{subsystem(i)}$, which should be smaller and simpler than models involving the entire system domain. The system contributions are included through the interactions $\hat{u}_{subsystem(i)}$.

On the other hand, there are many cases in which the subsystem behavior is strongly coupled to that of the overall system in such a way that even small changes to a subsystem can strongly affect the interactions between the system and subsystem(s). This category of problem is the main focus of the present invention. In these cases, design optimization of the subsystem(s) currently requires that a mathematical model of the complete system be used so that these interactions can be taken into account directly. These full system level models are often very large and complicated, and thus a significant amount of computational time (e.g., 5-50 hours) may be required to simulate the performance of each new design scenario. Because many (e.g., 50-50,000) potential design evaluations might be necessary to perform a high fidelity design optimization involving a large number (e.g., 10-1,000) of design variables, it would take many weeks to perform a design optimization study on even a small subsystem. Thus, this class of problems is currently viewed as intractable.

The objective of the present invention is to drastically reduce the time and effort required to perform design optimization on subsystems whose performance is strongly coupled to that of the complete system to which they belong. The goal of the current approach is to reduce the computational time for such design studies by a factor of 10-1,000, depending upon the problem definition.

Let us assume that a given design optimization statement as in Equation (2) requires that a minimum number of design evaluations be performed, this number of evaluations depending primarily upon the number and type of design variables, the nature of the design space, and the optimization search process employed. Then, a reduction in the computational effort required to optimize a subsystem must be achieved by reducing the computational effort to evaluate each design scenario. Here, a technique is sought in which most design evaluations can be performed using the subsystem mathematical models, which should be much smaller and computationally more efficient than the complete system level model. But such an approach must also account for the sometimes strong interactions between the performance of the system and the subsystem(s).

In a typical design optimization problem, the goal is to design a system so that it behaves in a prescribed or optimal manner in a given environment or under a set of prescribed conditions. The challenge of the current problem is to simultaneously identify both a subsystem that is optimal according to a specified criterion and the interactions (acting as subsystem boundary conditions) under which the subsystem should behave optimally.

In the general case, the interactions associated with the optimal design cannot be known until the design approaches its optimal form, and the final optimal design cannot be identified until the interactions approach a form associated with the final optimal design. In other words, the optimal design and the interactions are interdependent, and they must be codetermined. Using the previous notation, we may denote the subsystem design variables as $x^1$, and the interactions represent the global variables, z.

Figure 2:
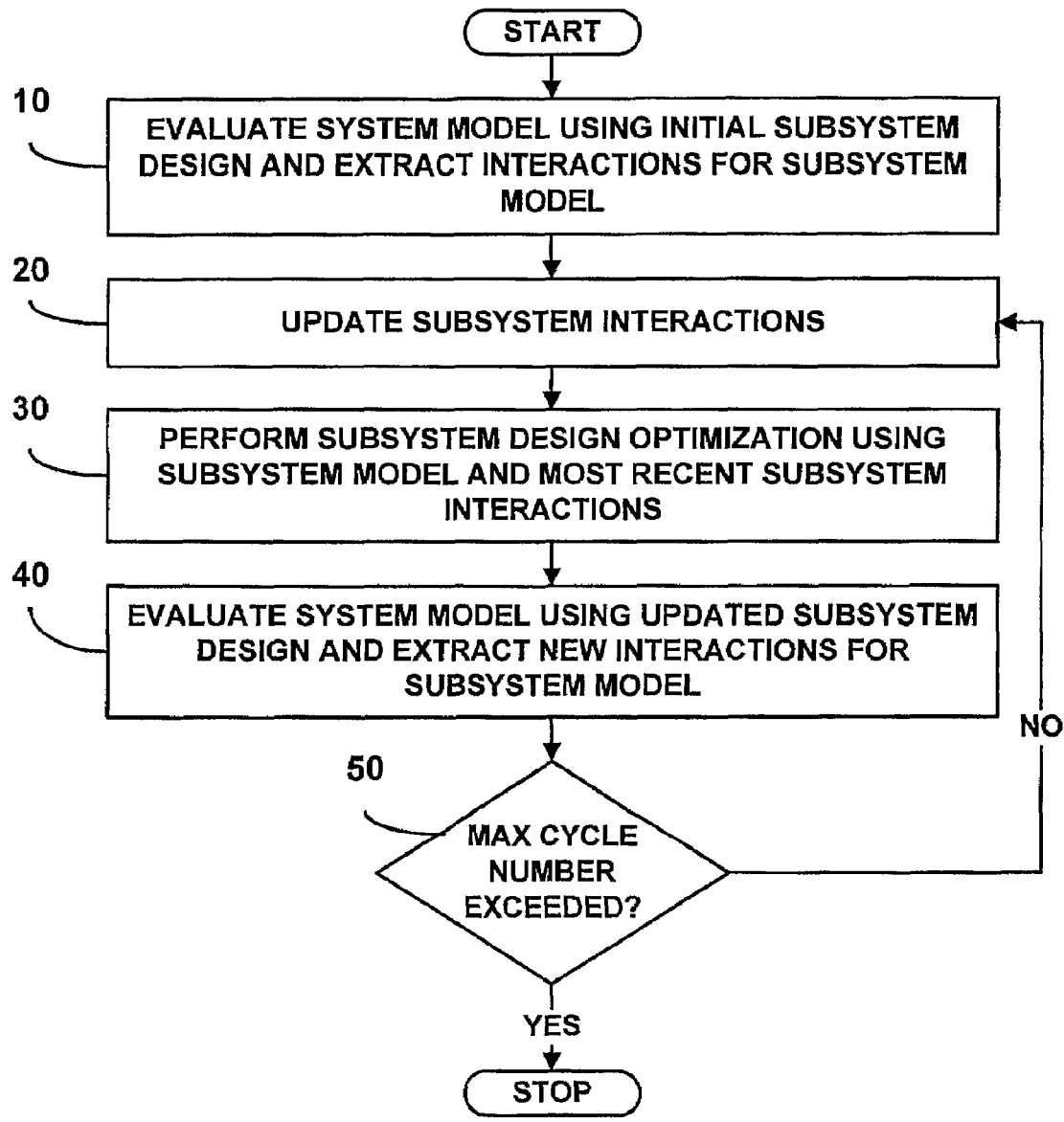
FIG. 2 is a simplified flow chart for a sample direct iteration strategy to solve multi-level optimization problems.

Turning now to FIG. 2, a direct iterative approach can be devised to solve this problem without the need for calculating sensitivity derivatives. In a simple form, the process can involve steps 10-50. In particular, the process begins at step 10 with evaluation of the system model using an initial subsystem design and extraction of interactions for the subsystem model. Next, step 20 includes updating the system interactions. Then, subsystem design optimization is performed in step 30 using the subsystem model and most recently updated subsystem interactions. In turn, the system model is evaluated in step 40 using an updated subsystem design and new interactions are extracted for the subsystem model. Finally, if a maximum number of cycles is not exceeded at decision step 50, then the process returns to step 20, where the interactions are updated and processing continues as described above in steps 30 and 40. Otherwise, the process ends. This is only one embodiment of the process according to the present invention. Several other forms corresponding to particular multi-level design optimization strategies have been developed, and many more are envisioned.

Note that the subsystem optimization in step 30 is typically terminated prior to full convergence to the optimal solution. There is no point in expending the extra effort toward finding an exact subsystem optimum prior to identifying subsystem boundary conditions that are close to their final form. Hence, the iterative process often proceeds using near optimal subsystem solutions.

The simple iterative scheme described above works well in a limited number of cases wherein the interactions associated with the initial subsystem design(s) do not differ appreciably from those of the final optimal design(s). In these cases, the interactions experience only small changes due to modifications in a subsystem design, because the coupling between the system performance and the subsystem design is relatively small.

When the interactions vary moderately or strongly due to changes in a subsystem design, the process described above often does not lead to convergence toward the optimal system or subsystem design(s). The main reasons for this failure are associated with the form of the interactions and the associated optimized subsystem design(s) at intermediate iterations. During the subsystem design optimization process, designs are found that are optimal or near optimal with respect to intermediate forms of the interactions. An intermediate near optimal subsystem design found in step 30 may give rise to an updated set of interactions in step 40 for which subsequent optimization iterations do not converge toward the desired optimal system solution. In other words, the subsequent optimal subsystem design(s) are strongly sensitive to the interactions. This behavior can also be likened to being stuck in a local optimum, though in the current case the local optimum is an artificial one that is not associated with actual interactions between the system and the subsystem.

The authors have discovered that convergence difficulties associated with the scheme described above are largely overcome when the optimized subsystem design(s) in iteration k:
1. have good performance under the $k^{th}$ set of interactions; and
2. exhibit similar performance characteristics under the $k^{th}$ and $(k+1)^{th}$ interactions (i.e., the system and subsystem responses of interest in steps 30 and 40, respectively, do not have significantly different gradients or eigenmodes).

Thus, it is important during intermediate iterations to identify optimal or near optimal subsystem designs that have similar performance under small to moderate variations in the interactions. Optimal subsystem designs that satisfy the above criteria are said to be robust against stochastic variations in the interactions.

Convergence may also be improved by reducing the magnitude of the change in the interactions from one iteration to the next, or by using a weighted average of the interactions at two or more consecutive steps.

In order to satisfy the conditions above, the interactions at iteration k can be cast in the form:

$$\hat{u}_{subsystem(i)} = \sum_{s=1}^{k} \tilde{w}_s \hat{u}_s \text{ on } \Gamma_{subsystem(i)} \qquad (3)$$

where $\hat{u}_S(x,y,z,t)$ are the generalized interactions (for example, generalized displacements and/or forces) on the interface $\Gamma_{subsystem(i)}$ at iteration s, and $\tilde{w}_s(x,y,z,t)$ are weight functions whose spatial and temporal distributions are predetermined and whose magnitudes are varied stochastically within a selected range during subsystem optimization. A common form of Equation (3) is:

$$\hat{u}_{subsystem}(i) = \tilde{w}_1 \hat{u}_{k-1} + \tilde{w}_2 \hat{u}_k \text{ on } \Gamma\Gamma_{subsystem}(i) \qquad (4)$$

where $\hat{u}_{k-1}(x,y,z,t), \hat{u}_k(x,y,z,t)$ are the interactions on $\Gamma_{subsystem(i)}$ at iterations k−1 and k, respectively; and $\tilde{w}_1(x,y,z,t), \tilde{w}_2(x,y,z,t)$ are weight functions whose spatial and temporal distributions are predetermined and whose magnitudes are varied stochastically. The manner in which the stochastic nature of the interactions is accommodated depends primarily on the optimization search process(es) that are used in the subsystem optimization step. Note that the spatial and temporal variations of $\tilde{w}_1(x,y,z,t), \tilde{w}_2(x,y,z,t)$ may be specified in a number of ways, and may be intentionally formulated so as to guide the solution in the expected or desired direction.

It is possible for the interactions between the system and a subsystem to be specified or constrained along a portion of the boundary $\Gamma_{subsystem(i)}$, whenever this interaction is either known or desired to be of a particular form.

Figure 3:
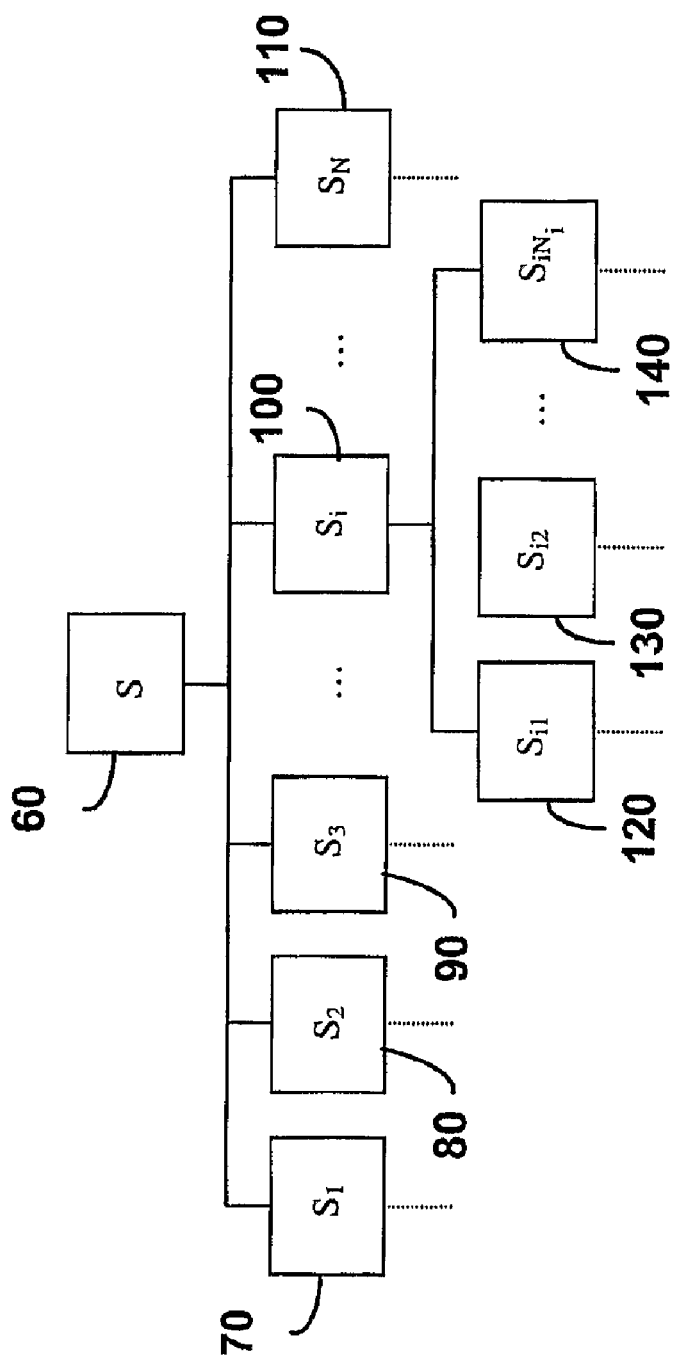
FIG. 3 is a block diagram illustrating hierarchical decomposition of a system into multiple levels of subsystems.

Turning now to FIG. 3, the procedure described above can be generalized to the case in which the system is hierarchically decomposed into N subsystems, wherein the $i^{th}$ subsystem is further decomposed into $N_i$ subsystems, each of which is further decomposed into $N_{ij}$ subsystems, and so on. Denoting the complete system as S and each subsystem as $S_{ijklm}$..., where the subscripts indicate the hierarchical order of the subsystem, the hierarchical decomposition of the system is arranged in components 60-140. For example, component 60 is the S component. Also, components 70-90 are the $S_1$, $S_2$, and $S_3$ components, respectively. Further, component 100 is the $S_i$ component. Yet further, component 110 is the $S_N$ component. Finally, components 120-140 are the $S_{i1}$, $S_{i2}$, and $S_{iN_i}$ components, respectively.

Though the special case and explanations above refer to subsystems in the spatial domain, it is also possible to apply this decomposition approach to the domains of time, design space, and physical discipline. It is further possible for multiple types of decomposition to exist in the same decomposed system.

For an example application to the time domain, consider a case in which it is desired to optimize a design's performance during a certain interval of time $(t_1,t_2)$ that represents a portion of a total event time $(t_0,t_f)$, where $t_0 \leq t_1 \leq t_2 \leq t_f$. In this case, the solution at $t_1$, which here plays the role of initial conditions for the solution during the time interval $(t_1,t_2)$, serves as the interactions used in the process described above with respect to FIG. 2. The subsystem under consideration is the time interval $(t_1,t_2)$. Changes to the design that improve or optimize its performance during $(t_1,t_2)$ will likely also affect the design's behavior prior to $t_1$, and thus the subsystem interactions at $t_1$ will be altered. As before, the interactions (here taking the form of initial conditions) must now be codetermined along with the design itself using an iterative approach such as the one described herein. Here, the use of stochastically perturbed interactions will help to achieve design robustness against small to moderate changes in the interactions, thereby discouraging the tendency to get stuck in local optima that are an artifact of intermediate forms of the interactions.

As an example of design space decomposition, the complete set of subsystem design variables can be segregated into N subsets $x^i$ (i=1 to N) in such a way that every subsystem variable belongs to one and only one subset. As part of an optimization strategy, it may be desirable to consider design changes corresponding to only one set of subsystem design variables at a time, with all global variables z and subset design variables belonging to the other sets temporarily assigned fixed values, these values perhaps corresponding to an initial guess or to the best design found to date. In this case, the fixed variables play the role of the interactions in the process described above with reference to FIG. 2, and the subsystem under consideration is the set of subsystem design variables that are allowed to change in order to optimize or improve performance. When the value of each subsystem design variable in the set under consideration is modified, it is expected that the values assigned to the fixed variables will not correspond to the optimal design (until convergence is reached) due to coupling among the sets of design variables. Thus, as before, the subsystem design (i.e., the set of design variables being modified) should be determined so as to be robust against small to moderate changes in the temporarily fixed design variables (the interactions).

In multilevel multidisciplinary optimization (MDO), each subsystem may represent a different disciplinary analysis of the same system. The interactions correspond to the global response quantities z that affect more than one discipline. During subsystem optimization, these global system variables are fixed at intermediate values. To improve convergence, the subsystem designs should be made robust against small to moderate variations in these fixed quantities.

Combinations of the above decompositions are readily accomplished. It is possible to define applications of the current approach to a particular discipline related to a subset of the design variables in a subregion of the physical domain and during a portion of the total event time interval.

Returning to FIG. 2, the manner in which robustness is achieved in step 30 does not seem to be critical to the success of this approach. In some cases, it is sufficient to evaluate potential design candidates a few times under interactions that vary stochastically about the mean interactions identified in step 40. Those subsystem designs whose performance does not degrade significantly over the range of these varied conditions should have a better chance of behaving similarly in the system model. In particular, key subsystem responses such as solution gradients and eigenvectors as well as instabilities and singularities should not have substantially different characteristics when evaluated in the system model. It is also possible to achieve a more rigorous satisfaction of subsystem robustness by performing the subsystem optimization with a constraint on robustness of the solution under stochastic variations of the interactions. The manner in which robustness is achieved is not critical to the performance of this method.

The size (magnitude) of the stochastic variability on the interactions is a parameter that must be specified by the user or set by default. In several previous applications of this method, variations on the order of 5%-20% were found to be ideal. Generally, the magnitude of stochastic variation on the interactions used for subsystem optimization should be less than the actual variation in interactions between the initial and the final design. This can sometimes be estimated a priori based on experience or estimated during the optimization based on the history of changes in the interactions.

It is also advantageous to allow adaptable variability on the interactions according to the solution convergence characteristics. For example, when a subsystem near optimal design is passed to the system model for a complete evaluation, the system performance is not always improved. This may be a sign that either the subsystem design is not near enough to the optimal solution so that additional subsystem optimization search is needed, or the subsystem design is not sufficiently robust against changes in the interactions, or for some reason the change in the interactions is larger than can be properly handled by the iterative process. In each of these cases, additional subsystem search with a slightly higher level of stochastic variability on the previous set of interactions is called for. In the third case, the interactions may also be scaled back toward those of the previous iteration using Equation (3).

Maintaining stochasticity of the interactions throughout the entire optimization procedure will affect the form of the final subsystem design. If a subsystem design is sought that is optimal with respect to deterministic system boundary conditions and subsystem interactions, then the level of stochastic variation in the interactions should be gradually reduced to zero in accordance with the degree of solution convergence. Alternatively, or when a suitable convergence criterion is not available, an approximation to the optimal deterministic solution can be obtained by executing a final cycle of the process described with respect to FIG. 2 during which the interactions are implemented without stochastic variations.

In practical applications, it is important to search for design solutions that are not just optimal but rather are optimal with respect to a constraint on robustness. The current methodology leads to subsystem designs that are robust within the system in which they perform. This is a higher level of robustness that has yet to be explored sufficiently in practice, but which should provide numerous benefits.

Figure 4:
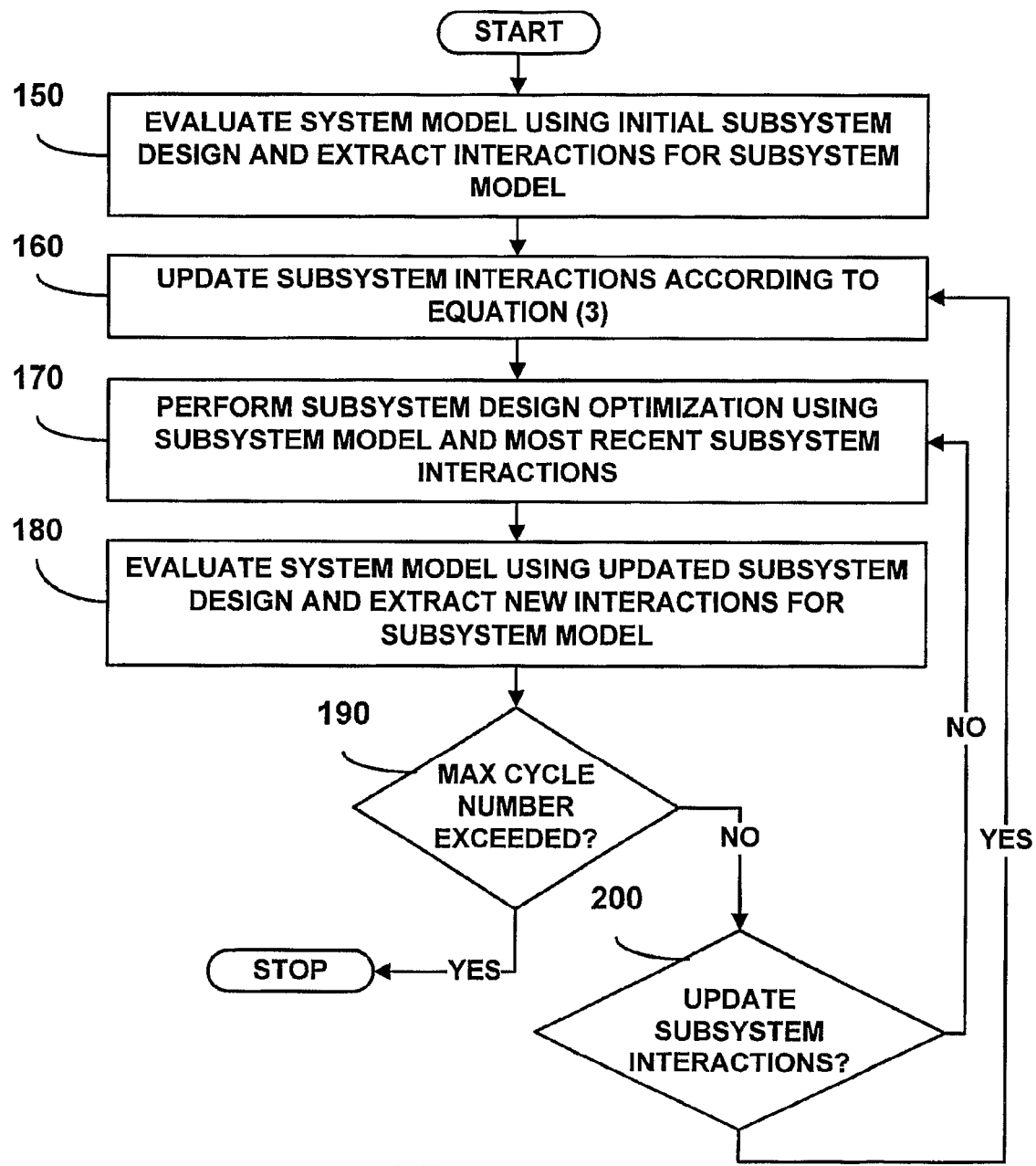
FIG. 4 is an updated flow chart for a sample direct iteration strategy to solve multi-level optimization problems.

Turning now to FIG. 4, in a more generalized form accounting for stochastic interactions and control of interactions updating, the process according to the present invention can include steps 150-200. In particular, the process starts at step 150 with evaluation of the system model using an initial subsystem design and extraction of interactions for the subsystem model. Then, step 160 accomplishes update of subsystem interactions according to Equation (3). Next, design optimization is performed at step 170 using the subsystem model and most recent stochastic subsystem interactions. In turn, the system model is evaluated at step 180 using the updated subsystem design and new interactions are extracted for the subsystem model. Finally, decision steps 190 and 200 respectively determine whether a maximum number of cycles has been exceeded and whether subsystem interactions should be updated. If the maximum number of cycles is determined not to have been exceeded at decision step 190, but it has been determined at step 200 that updating should occur, then processing returns to step 160. Otherwise, if the maximum number of cycles is determined not to have been exceeded at decision step 190, then processing returns to step 170. However, if the maximum number of cycles is determined to have been exceeded at decision step 190, then processing ends.

The decision of whether to update the interactions at decision step 200 is based primarily on whether the solution is improving according to the objective function. If improvement is being made, then the interactions can and in most cases should be updated using those from the most recent system level evaluation in step 180. If the new solution is worse than previous solutions, then either additional search at higher variation should be performed, or the interactions should be scaled back according to Equation (3). Whether or not the mean interactions are updated, the level of variability can be modified at this point based on the solution convergence measure. The current strategy is independent of the optimization search process used to optimize any subsystem. For example, an optimization search process can be employed like the one disclosed in Jianjun Hu, Erik Goodman, and Ronald Rosenberg, "Robust and Efficient Genetic Processs with Hierarchical Niching and a Sustainable Evolutionary Computation Model," Proc. 2004 Genetic and Evolutionary Computation Conference, Lecture Notes in Computer Science, Springer, June, 2004, Seattle Wash., Part I, pp. 1220-1232. The disclosure of the aforementioned publication is incorporated herein by reference in its entirety for any purpose. Moreover, it is possible to use an entirely different optimization search process to optimize different subsystems. The current strategy may utilize parametric optimization approaches, optimality criterion (OC) approaches, or any other type of search approach to obtain an optimized subsystem.

In its current form, this approach is a single point optimization method with respect to the global system. Thus, it will most often lead to a system level local optimum or near optimum. It can be employed as a global optimizer by using multiple starting points (i.e., starting the process with different initial subsystem designs). At the subsystem level, any global or local optimization scheme may be used.

The most important ingredients of some embodiments, namely the use of stochastic interactions and the controls for step size, can be used within any multi-level optimization strategy in order to avoid the necessity of computing sensitivity derivatives.

The system and subsystem models need not be of the same type. The only requirement is that the interactions between the system and subsystem can be identified, with sufficient accuracy to make the subsystem analyses meaningful, by performing an evaluation of the system model. The use of different model types for the system and subsystem can be of significant advantage in some cases. The following list of examples is by no means exhaustive, but does illustrate this point clearly.

An explicit dynamic finite element model may be needed for a quasi-static system level analysis in order to account for very high amounts of nonlinearities and contact. A corresponding subsystem model may experience no contact conditions and only mild nonlinearities, so an implicit finite element model can be used at the subsystem level. Due to its larger allowable time step, an implicit subsystem model may be much more computationally efficient than an explicit subsystem model, especially for a relatively small sized subsystem finite element model.

As long as the global model can accurately resolve the primary system level responses and especially the interactions, the global model may be as coarse as possible. On the other hand, a more refined model may be needed to capture the important behaviors of the local model.

Whereas several sources of nonlinearity may be present at the system level, a corresponding subsystem may behave linearly. Therefore, a linear model can be used at the subsystem level while a nonlinear model is used to resolve the system level response and the interactions.

In some cases, a subsystem may be of a form that admits a closed-form solution (e.g., buckling of a rectangular composite panel). In these cases, an efficient and accurate closed-form solution can be used at the subsystem level, while a numerical model may be required to account for geometrical or other complexities at the system level.

The current approach may use one or multiple agents in its search. For example, each subsystem level search may use one or more search agents, each performing independent search but collaborating with other agents, while the system level evaluations are performed within a separate agent. Further, the current approach may be used within one or a group of agents as a component within a broader multi-agent search strategy.

When applying existing approaches to design problems in which each evaluation is very expensive, engineers can afford to perform only a small number of design iterations due to time and resource constraints. Hence, only a small number (e.g., 2-8) of design parameters can be considered. The main advantage of the current approach is that potentially thousands of design iterations can be performed in about the same amount of time required to perform 5-15 system level evaluations. Therefore, potentially hundreds or thousands of design parameters can be considered simultaneously. With this approach, engineers can achieve designs with significantly higher performance and robustness, and in less time.

Furthermore, engineers can thoroughly explore new design concepts that were previously ignored due to their computational complexity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of manufacturing a mechanical part, comprising:
   (a) constructing a system model for a mechanical system having the mechanical part and at least one other mechanical part of the mechanical system, the system model comprised of multiple subsystem models including a given subsystem model that includes the mechanical part;
   (b) evaluating the system model using initial subsystem designs and extracting interactions between the given subsystem model and other subsystems models;
   (c) updating the interactions for the given subsystem model;
   (d) performing subsystem design optimization on the given subsystem model using the subsystem model and most recently updated interactions while varying magnitude of stochastic variability on the interactions in a range on the order of 5% to 20% during the subsystem design optimization, thereby obtaining an updated subsystem design; and
   (e) manufacturing the mechanical part based on the updated subsystem design.

2. The method of claim 1, wherein step (c) includes updating the interactions for the subsystem model i at iteration k according to:

$$\hat{u}_{subsystem(i)} = \sum_{s=1}^{k} \tilde{w}_s \hat{u}_s \text{ on } \Gamma_{subsystem(i)}$$

where $\hat{u}_s(x,y,z,t)$ are the interactions on the subsystem boundary $\Gamma_{subsystem(i)}$ at iteration s, and $\tilde{w}_s(x,y,z,t)$ are weight functions.

3. The method of claim 2, wherein said interactions are primary variables relating to generalized displacements.

4. The method of claim 2, wherein said interactions are secondary variables relating to generalized forces.

5. The method of claim 2, wherein said interactions are primary variables relating to generalized displacements and secondary variables relating to generalized forces.

6. The method of claim 2, wherein the weight functions have predetermined spatial and temporal distributions.

7. The method of claim 2, wherein the weight functions have magnitudes that are varied stochastically within a selected range during performance of the subsystem design optimization.

8. The method of claim 1, further comprising:
   (f) evaluating one or more system models using one or more updated subsystem designs to extract new interactions for one or more subsystem models; and
   (g) evaluating and selectively obeying a termination condition.

9. The method of claim 8, further comprising selectively returning to step (c) and updating the interactions if a solution is improving according to an objective function, thereafter proceeding to steps (d), then (e), and then (f).

10. The method of claim 8, further comprising selectively returning to step (c) if the solution is not improving according to the objective function, thereafter proceeding to steps (d), then (e), and then (f), wherein at least one of additional search at higher variation is performed, or the interactions are scaled back toward those of previous iterations according to:

$$\hat{u}_{subsystem(i)} = \sum_{s=1}^{k} \tilde{w}_s \hat{u}_s \text{ on } \Gamma_{subsystem(i)}$$

11. The method of claim 1, further comprising selectively returning to step (d) if a solution is not improving according to an objective function.

12. The method of claim 11, wherein additional search at higher variation is performed.

13. The method of claim 11, wherein interactions are scaled back toward those of previous iterations according to:

$$\hat{u}_{subsystem(i)} = \sum_{s=1}^{k} \tilde{w}_s \hat{u}_s \text{ on } \Gamma_{subsystem(i)}$$

14. The method of claim 1, further comprising evaluating one or more system models using one or more updated subsystem designs to extract new interactions for one or more subsystem models.

15. The method of claim 1, further comprising evaluating and selectively obeying a termination condition.

16. The method of claim 1, further comprising selectively returning to step (c) and updating the interactions if a solution is improving according to an objective function.

17. The method of claim 1, wherein the mechanical part is a motor vehicle part, and the mechanical system is a motor vehicle or part thereof having multiple, interacting mechanical parts including the mechanical part.

18. A computer-implemented design optimization method, comprising:
   (a) the computer evaluating a system model comprised of multiple subsystem models using initial subsystem designs and extracting interactions between a given subsystem model and other subsystem models;
   (b) the computer updating the interactions for the given subsystem model; and
   (c) the computer performing subsystem design optimization on the given subsystem model using the subsystem model and most recently updated interactions while limiting magnitude of stochastic variability on the interactions in a during the subsystem design optimization within a selected range having more than one value, thereby obtaining an updated subsystem design.

19. The method of claim 18, wherein step (b) includes updating the interactions for the subsystem model i at iteration k according to:

$$\hat{u}_{subsystem(i)} = \sum_{s=1}^{k} \tilde{w}_s \hat{u}_s \text{ on } \Gamma_{subsystem(i)}$$

where $\hat{u}_s(x,y,z,t)$ are the interactions on the subsystem boundary $\Gamma_{subsystem(i)}$ at iteration s, and $\tilde{w}_s(x,y,z,t)$ are weight functions.

20. The method of claim 19, wherein said interactions are primary variables relating to generalized displacements.

21. The method of claim 19, wherein said interactions are secondary variables relating to generalized forces.

22. The method of claim 19, wherein said interactions are primary variables relating to generalized displacements and secondary variables relating to generalized forces.

23. The method of claim 19, wherein the weight functions have predetermined spatial and temporal distributions.

24. The method of claim 19, wherein the weight functions have magnitudes that are varied stochastically within a selected range during the optimization process.

25. The method of claim 18, further comprising:
(d) evaluating one or more system models using one or more updated subsystem designs to extract new interactions for one or more subsystem models;
(e) evaluating and selectively obeying a termination condition.

26. The method of claim 25, further comprising selectively returning to step (b) and updating the interactions if a solution is improving according to an objective function, thereafter proceeding to steps (c), then (d), and then (e).

27. The method of claim 25, further comprising selectively returning to step (c) if the solution is not improving according to the objective function, thereafter proceeding to steps (c), then (d), and then (e), wherein at least one of additional search at higher variation is performed, or the interactions are scaled back toward those of previous iterations according to:

$$\hat{u}_{subsystem(i)} = \sum_{s=1}^{k} \tilde{w}_s \hat{u}_s \text{ on } \Gamma_{subsystem(i)}$$

28. The method of claim 18, further comprising selectively returning to step (c) if a solution is not improving according to an objective function.

29. The method of claim 28, wherein additional search at higher variation is performed.

30. The method of claim 28, wherein interactions are scaled back toward those of previous iterations according to:

$$\hat{u}_{subsystem(i)} = \sum_{s=1}^{k} \tilde{w}_s \hat{u}_s \text{ on } \Gamma_{subsystem(i)}$$

31. The method of claim 18, further comprising evaluating one or more system models using one or more updated subsystem designs to extract new interactions for one or more subsystem models.

32. The method of claim 18, further comprising evaluating and selectively obeying a termination condition.

33. The method of claim 18, further comprising selectively returning to step (b) and updating the interactions if a solution is improving according to an objective function.

34. A computer-implemented design optimization method, comprising:
(a) the computer evaluating a system model comprised of multiple subsystem models using initial subsystem designs and extracting interactions between a given subsystem model and other subsystem models;
(b) the computer updating the interactions for the given subsystem model i at iteration k according to $$\hat{u}_{subsystem(i)} = \sum_{s=1}^{k} \tilde{w}_s \hat{u}_s \text{ on } \Gamma_{subsystem(i)}$$

where $\hat{u}_s(x,y,z,t)$ are the interactions on the subsystem boundary $\Gamma_{subsystem(i)}$ at iteration s, and $\tilde{w}_s(x,y,z,t)$ are weight functions; and
(c) the computer performing subsystem design optimization on the given subsystem model using the subsystem model and most recently updated interactions while the magnitudes of the weight functions have predetermined spatial and temporal distributions and are varied stochastically during the subsystem design optimization in a range having more than one value, thereby obtaining an updated subsystem design.

35. The method of claim 34, wherein said interactions are primary variables relating to generalized displacements.

36. The method of claim 34, wherein said interactions are secondary variables relating to generalized forces.

37. The method of claim 34, wherein said interactions are primary variables relating to generalized displacements and secondary variables relating to generalized forces.

38. The method of claim 34, further comprising:
(d) evaluating one or more system models using one or more updated subsystem designs to extract new interactions for one or more subsystem models;
(e) evaluating and selectively obeying a termination condition.

39. The method of claim 38, further comprising selectively returning to step (b) and updating the interactions if a solution is improving according to an objective function, thereafter proceeding to steps (c), then (d), and then (e).

40. The method of claim 38, further comprising selectively returning to step (c) if the solution is not improving according to the objective function, thereafter proceeding to steps (c), then (d), and then (e), wherein at least one of additional search at higher variation is performed, or the interactions are scaled back toward those of previous iterations according to:

$$\hat{u}_{subsystem(i)} = \sum_{s=1}^{k} \tilde{w}_s \hat{u}_s \text{ on } \Gamma_{subsystem(i)}.$$

41. The method of claim 34, further comprising selectively returning to step (c) if a solution is not improving according to an objective function.

42. The method of claim 41, wherein additional search at higher variation is performed.

43. The method of claim 41, wherein interactions are scaled back toward those of previous iterations according to:

$$\hat{u}_{subsystem(i)} = \sum_{s=1}^{k} \tilde{w}_s \hat{u}_s \text{ on } \Gamma_{subsystem(i)}.$$

44. The method of claim 34, further comprising evaluating one or more system models using one or more updated subsystem designs to extract new interactions for one or more subsystem models.

45. The method of claim 34, further comprising evaluating and selectively obeying a termination condition.

46. The method of claim 34, further comprising selectively returning to step (b) and updating the interactions if a solution is improving according to an objective function.

* * * * *

UNITED STATES PATENT AND TRADEMARK OFFICE
CERTIFICATE OF CORRECTION

PATENT NO. : 7,756,688 B2
APPLICATION NO. : 11/579,711
DATED : July 13, 2010
INVENTOR(S) : Ronald C. Averill, Ran Mohan Jit Singh Sidhu and Praveen Halepatali It is certified that error appears in the above-identified patent and that said Letters Patent is hereby corrected as shown below:

On the Title Page, Item (56), References Cited, Other Publications, page 2, 2nd Col., reference No. 1, "AIAA/SSMO" should be --AIAA/ISSMO--.

Column 3, line 34, after "$\Omega_{subsystem(j)}$", insert --.--.

Column 3, line 36, "To" should be --to--.

Column 4, line 19, "$G_i$" should be --$G_{ij}$--.

Column 5, line 29, "$x^1$" should be --$x^i$--.

Column 6, line 57, "IT" should be --$\Gamma$--.

Column 9, line 55, "Seattle Wash." should be --Seattle, WA--.

Column 11, line 20, Claim 1, "subsystems" should be --subsystem--.

Column 12, lines 52-53, Claim 18, after "interactions", delete "in a".

Signed and Sealed this

Sixteenth Day of November, 2010

David J. Kappos
*Director of the United States Patent and Trademark Office*